United States Patent Office 3,117,130
Patented Jan. 7, 1964

3,117,130
TRIBUTYL-TIN SALT OF LEVULINIC HYDANTOIN
Domenick Donald Gagliardi, East Greenwich, and William J. Jutras, Jr., Peace Dale, R.I., assignors to Argus Chemical Corporation, Kings County, N.Y.
No Drawing. Original application Aug. 1, 1958, Ser. No. 752,435, now Patent No. 2,985,541, dated May 23, 1961. Divided and this application June 24, 1960, Ser. No. 42,740
1 Claim. (Cl. 260—299)

This invention relates to metal salts of the hydantoin of levulinic acid and their condensation products with formaldehyde and is a continuation in part of our patent application, Serial No. 661,577, filed May 27, 1957 now Patent 2,955,057. This application is a division of Ser. No. 752,435, filed August 1, 1958, now Patent 2,985,541.

In our parent application, we mentioned that the presence of the COOH groups in the hydantoin of levulinic acid—in the following called LH—and its condensation products with formaldehyde makes it possible to form salts of any metal.

Such products may have numerous uses, depending on the nature of the metal concerned. Condensation products containing Mn, Mg, Co, and Fe are useful as plant nutrients; Al derivatives serve as adhesives, and certain salts of Zn, Cu, Ag, and tributyl tin have very interesting bactericidal and mildew-proofing properties.

It is an object of the present invention to prepare various metal salts of LH, especially salts of heavy metals, i.e. those not belonging to the alkali metal group, with a view to making monomeric condensation products of said salts with formaldehyde and resins therefrom for the various uses mentioned above.

Other objects will appear hereinafter.

The metal salts according to the invention are represented by the formula

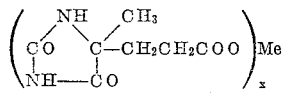

in which Me stands for the desired metal with the exception of the metals of the alkali group, and where the value of $x$ may vary from 1 to 4, depending on the valency of the metal. More particularly, Me also represents the group $(C_4H_9)_3Sn$.

In the preparation of the metal salts we use known methods. The hydantoin derived from levulinic acid is mixed with a metal salt, e.g. the acetate or carbonate, or with a metal oxide or hydroxide, and is reacted in aqueous solution while heating, until the formation of the salt is practically complete.

For preparing the condensation products, we generally proceed by first mixing the selected salt with formaldehyde and heating the mixture for several hours at temperatures ranging from 25° C. to 100° C. until condensation has taken place. The molar ratio of formaldehyde and salt of hydantoin may be from one to two moles of formaldehyde to one mol of hydantoin salt. The condensation is carried out in acid, or alternatively in alkaline medium followed by acidification at pH ranges from 2.0 to 10.0.

When it is desired to make a condensation product by using urea or melamine together with formaldheyde, the condensation is carried out along similar lines. The molar ratio of the three components can vary over a wide range. LH or its metal salts can be a major or minor proportion of the end product.

The curing of these resinous products in their end-use application is effected by heating from 250° to 400° F. until the polymerization has been completed.

The invention will be described more particularly in the following examples, but it should be understood that these are given by way of illustration and not of limitation and that many changes in the details can be made without departing from the spirit of the invention.

Parts are given by weight.

EXAMPLE 1

*Preparation of the Cupric Salt of LH*

74.4 p. LH (0.4 mol), 39.8 p. $Cu(OOC.CH_3)_2H_2O$ (0.2 mol) and 100 p. water were mixed together and heated until a dark green solution was obtained. The solution was transferred to an evaporating dish and heated on the boiling water bath for 12 hours, yielding 92 parts of dark green solid. The solid was powderized; it represented 95% of the desired salt and was water-soluble.

EXAMPLE 2

As described in Example 1, the cobalt salt was made from LH and cobaltous acetate.

The final product is a rose-colored powder, containing 94.5% of the desired salt. It is partially soluble in cold water and completely soluble in hot water.

EXAMPLE 3

In essentially the same way, the Zn salt was prepared from LH and ZnO. The salt represents a brittle, pale yellow solid which is easily soluble in water. It fluoresces in visible and U.V. light.

EXAMPLE 4

The aluminum salt of LH was prepared from 55.8 (0.3 mol) LH, 7.8 $Al(OH)_3$ (0.1 mol), 125 $H_2O$, and 18 acetic acid. The mixture was boiled for 15 minutes and since only part of the $Al(OH)_3$ had dissolved, another 25 $H_2O$ and 18 acetic acid were added. After heating to 85° C. for 3 hours, the mixture was clear. Evaporation of the water left a white slurry, which was dried in an oven at 120° C. until all $H_2O$ evaporated. The final product was a light tan salt. It was water soluble.

EXAMPLE 5

Mg salt prepared from LH acid and $MgCO_3$ is a brittle white solid soluble in water.

Other salts were prepared in an analogous way. The following table shows certain properties of salts of LH.

| Anion | Color | Solubility in Water |
|---|---|---|
| Mg | White | Soluble. |
| Mn | Brown | Do. |
| Fe | Red brown | Insoluble. |
| Zr | Light brown | Do. |
| Al | Light Tan | Soluble. |
| Zn | Pale Yellow | Do. |
| Co | Rose | Soluble in hot w. |
| Cu | Dark Green | Do. |
| Hg | Light Brown | Do. |
| Sn | do | Insoluble. |
| Ag | White | Do. |
| $(C_4H_9)_3Sn$ | do | Do. |

The preparation of condensation products from the salts made according to the present invention are described in detail in our application, Ser. No. 7524,35, now Patent No. 2,985,541.

We claim:
A metal salt of hydantoin derived from levulinic acid having the formula
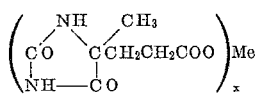
wherein the Me stands for tributyl-tin, and $x=1$.
References Cited in the file of this patent
UNITED STATES PATENTS
2,658,912 Pfister et al. _____ Nov. 10, 1953
2,798,875 Scheer et al. _____ July 9, 1957
OTHER REFERENCES
Guareschi: Beilstein (Handbuch, 4th edition), volume 25, page 247 (1936).